United States Patent [19]

De Castella et al.

[11] 4,292,055

[45] Sep. 29, 1981

[54] PURIFIER FOR GASEOUS FLUIDS

[76] Inventors: Pierre M. T. De Castella, La Vuachere, Monnaz, Switzerland, 1111; Charles L. Reinhold, 29, rue de Lancy, Carouge, Switzerland, 1227

[21] Appl. No.: 160,726

[22] Filed: Jun. 18, 1980

Related U.S. Application Data

[63] Continuation of Ser. No. 943,563, Sep. 18, 1978, abandoned, which is a continuation-in-part of Ser. No. 924,391, Jul. 13, 1978, abandoned, which is a continuation of Ser. No. 742,763, Nov. 18, 1976, abandoned.

[30] Foreign Application Priority Data

Nov. 25, 1975 [CH] Switzerland ............ 15239/75

[51] Int. Cl.³ .............................................. B01D 53/06
[52] U.S. Cl. ......................................... 55/233; 55/388; 55/390; 55/401; 55/498; 55/524; 261/89; 423/244
[58] Field of Search .................. 55/73, 233, 278, 351, 55/387, 388, 390, 400, 401, 498, 524, 34; 261/89, 87; 416/183, 18 A, 186 R; 423/210, 224, 230, 231, 244

[56] References Cited

U.S. PATENT DOCUMENTS

| | | | |
|---|---|---|---|
| 1,376,073 | 4/1921 | Borcherdt | 55/400 X |
| 1,393,335 | 10/1921 | Baldwin | 55/34 X |
| 1,731,924 | 10/1929 | Engelke | 261/89 |
| 2,272,746 | 2/1942 | Holm-Hansen | 55/400 X |
| 2,342,469 | 2/1944 | Holm-Hansen | 261/89 X |
| 2,467,346 | 4/1949 | Trubenbach | 55/278 |
| 2,601,519 | 6/1952 | Hardy et al. | 55/233 X |
| 2,655,310 | 10/1953 | Schlumbohm | 55/400 X |
| 2,706,016 | 4/1955 | Schlumbohm | 55/400 |
| 2,998,099 | 8/1961 | Hollingsworth | 261/87 X |
| 3,071,311 | 1/1963 | Schlumbohm | 55/400 |
| 3,128,940 | 4/1964 | McDonald | 416/184 X |
| 3,234,716 | 2/1966 | Sevin et al. | 55/401 X |
| 3,260,039 | 7/1966 | Brown et al. | 55/403 |
| 3,589,106 | 6/1971 | Onuki | 55/524 X |
| 3,676,985 | 7/1972 | Foreman et al. | 55/400 X |
| 3,710,548 | 1/1973 | Coughlin | 423/244 X |
| 3,723,598 | 3/1973 | Spedden et al. | 423/244 |
| 3,844,737 | 10/1974 | Macriss et al. | 55/390 X |
| 3,925,021 | 12/1975 | Yoshino et al. | 55/278 X |
| 3,969,479 | 7/1976 | Lonnes et al. | 423/245 X |

FOREIGN PATENT DOCUMENTS 1576495 5/1970 Fed. Rep. of Germany ........ 55/498

Primary Examiner—Robert H. Spitzer
Attorney, Agent, or Firm—Mallinckrodt & Mallinckrodt

[57] ABSTRACT

A gaseous fluid purifier comprising at least two disks having a common axis of symmetry or of rotation and spaced apart from each other; the disks are comprised of a roughened material adapted to adsorb impurities from the fluid being purified; the disks may be additionally impregnated with neutralizing, or the like, chemical substance; at least one of the disks is of conical shape; in some embodiments, the distance between the two disks at the peripheries of the disks is smaller than the distance between them at the center; a central aspiration opening of circular shape is provided in at least one of the two disks; rotation of at least one, and more usually both, of the two disks aspirates fluid to be purified through the aspiration opening and between the disks and the purified fluid exits radially from between the disks; in other embodiments, the disks are not conically shaped, but the disk surfaces are shaped to produce discontinuities in the fluid flow.

27 Claims, 13 Drawing Figures

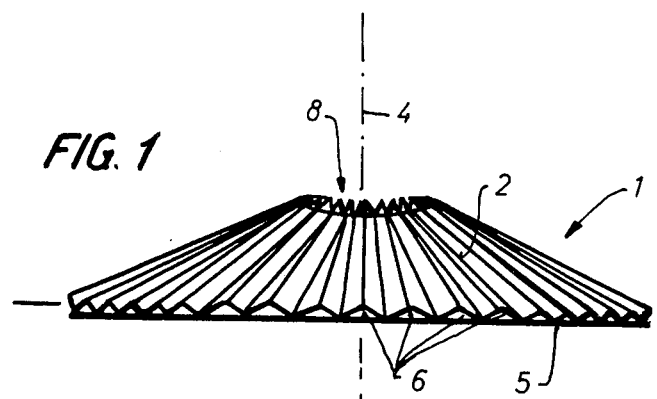
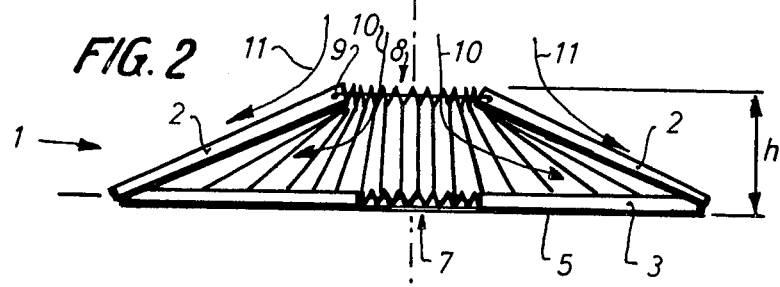
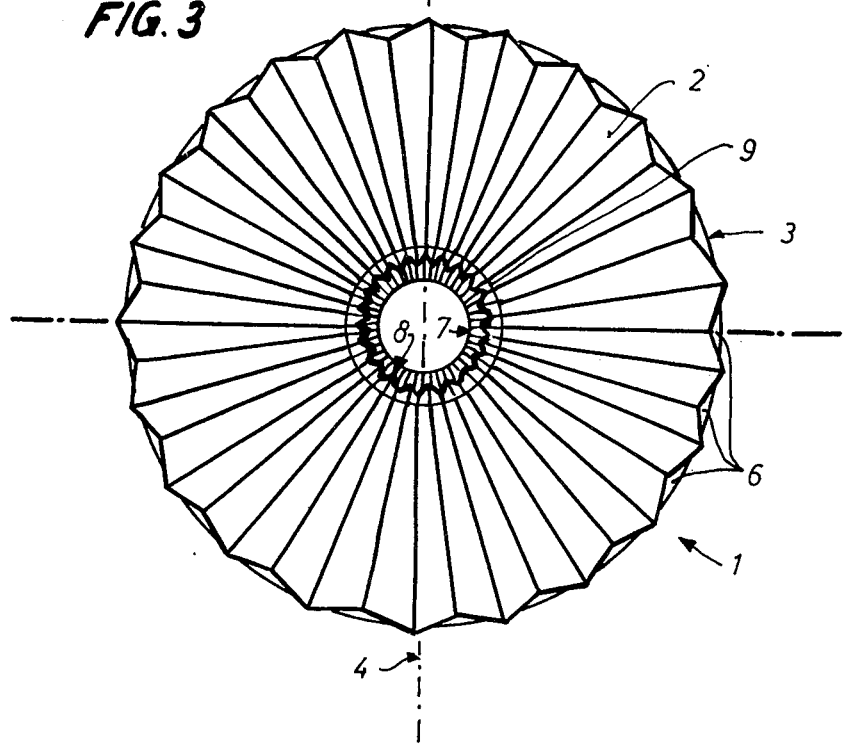

PURIFIER FOR GASEOUS FLUIDS

CROSS REFERENCE TO RELATED APPLICATION

This is a continuation of application Ser. No. 943,563, filed Sept. 18, 1978, which was a continuation in part of Application Ser. No. 924,391, filed July 13, 1978, which was a Continuation of Application Ser. No. 742,763, filed Nov. 18, 1976, all abandoned.

BACKGROUND AND SUMMARY OF THE INVENTION

The invention concerns a purifier for gaseous fluids, and more particularly a turbine having a rotor and including means for adsorbing impurities from the gaseous fluid.

By turbine is meant any apparatus whose rotor turning at high speed produces a centrifugation. In this description, the word turbine is synonymous with centrifugal ventilator.

Conventional air cleaning or purifying apparatus include screens of filter paper or fabric, or baskets (corfs) or baffles enclosing active substances in granular or liquid form and through which air is drawn or blown. Active carbon, beds of granular potassium permanganate and sawdust impregnated with manganese dioxide have all been proposed as active filtering material which retains impurities in the air by physical or chemical action. These known cleaning apparatus require means for strongly pulsing the air which are sufficiently powerful to overcome the head loss produced during passage of the air through the filters. The consumption of power and of costly chemical products used is high and is contrary to the efforts being made to economize power and depletable materials. Also, the noise produced by the pulsed air is a nuisance and cleaning and replacement of the filters is generally a difficult and dirty operation.

The gaseous-fluid cleaning apparatus according to the invention is characterized in that the filter is comprised of an adsorbent material able to retain particles in suspension in the gaseous fluid and disposed in such a manner that the flux of gaseous fluid produced by the turbine licks its surfaces without passing through them. The turbine is arranged to produce a flux of fluid with turbulent flow.

In preferred embodiments, the rotor of the turbine is comprised of said adsorbent material and hence provides both a ventilating function and a cleaning function.

According to the nature of the cleaning or purification to be carried out, the manner of construction of the turbine can vary.

In one preferred embodiment, the turbine comprises at least two disks having a common axis of symmetry or of rotation and which are spaced apart from each other. At least one of the disks is of conical shape. The distance between the two disks at the peripheries of the purifier is smaller than the distance between them at their centers. A central suction opening of circular shape is provided in at least one of the two disks.

The foregoing behaves not only as a radial or centrifugal fan but also as a filter which purifies the gaseous liquid which it displaces.

The purifying ability of the purifier having the shape of a filtering rotor which is the subject of the present invention is not caused by the same things as with conventional filters, which retain contaminants by absorption. The filtering rotor of the present invention acts by adsorption, i.e. it retains on its surface molecules of a gas or of a solution (aerosols) or solid particles (dust, bacteria, etc.) suspended in the gaseous fluid which is displaced upon the rotation of the filtering rotor. A true absorbent acts by physical, physical-chemical, or chemical means.

Scientific encyclopedias state that adsorption occurs with pulverulent or porous solids that have the property of retaining on their surfaces the molecules in gaseous or liquid phases that come in contact with them. This physico-chemical surface phenomenon is distinguished from the phenomenon of absorption, which is not a surface phenomenon. The solid is called the adsorbent and the gas or liquid the adsorbate. The adsorbents may be solid or liquid and the adsorbates may be gaseous, liquid, in solution or even in suspension. It does not appear that up to now any great amount of attention has been paid to the adsorption phenomena of a solid on a solid or of a liquid on a solid. The filtering rotor of the present invention also satisfies these two functions.

In the boundary layer theory of fluid mechanics, one studies the special features of the movement of a viscous liquid in the case of high Reynolds numbers. Within the boundary layer, which is the layer of fluid in contact with a moving solid (or vice versa), a region of laminar or turbulent flow may exist. The passage from laminar flow to turbulent flow in the boundary layer takes place when the Reynolds number reaches its critical value.

The present invention utilizes the consequences of the system of turbulent flow in which the fluid particles follow disorganized paths which are caused by forces of the rubbing of the fluid against moving solid walls. In turbulent flow, the value of the velocity of the particles of the fluid at each point in space undergoes continuous variations, both in value and in direction. This random movement of the masses of the fluid favors excellent contact between the fluid and the solid surfaces forming the filtering rotor. The capture of the solid or liquid particles suspended in the fluid upon contact with the solid surfaces which surround them is better when the roughness of these surfaces is greater.

It has not been possible until now to establish theoretically the exact form of the law of resistance governing the turbulent boundary layer. Thus, for this purpose, the results of experimental research on the boundary layer are used in addition to various simplifying hypotheses. For this reason, modern methods of calculating the turbulent boundary layer are semi-empirical and their precision depends upon the authenticity of the test materials taken as basis for the determination of the laws of the distribution of velocity and resistance. With a few exceptions, all the research work has been carried out in order to avoid the appearance of turbulent movements in contact with solids moving in a gaseous fluid (or vice versa), while the object of the present invention is to create such turbulent movements in order to derive therefrom an effect which has not been utilized up to now, namely the filtration of gaseous fluids by physical or chemical adsorption, or both simultaneously, when the constituent material of the filtering rotor i.e., the adsorbent, is impregnated with a chemical reagent whose catalytic effect chemically transforms the contaminating gas suspended in the fluid which is to be purified. This chemical adsorption phenomenon is also known as "chemisorption".

Rotation of the filtering rotor causes the aspiration of the contaminated gaseous fluid, assures its purification by adsorption, and discharges a purified fluid. The rotor may turn in the open air in the manner of a simple axial fan. This causes a movement of convection of the ambient air and thereby provides a closed-circuit ventilation of the room in which it is located, and it progressively purifies the air in the room. The filtering rotor may alternatively be enclosed in a housing. Then polluted air is removed from one enclosure via a conduit and is discharged in purified condition into another enclosure.

Measurements carried out on a chromic-acid aerosol have made it possible to note average filtration efficiencies of between 92.8% and 98.5% after a single passage of the polluted air through the housing with different constructions of the filtering rotor according to the invention.

The constituent material of the filtering rotor is preferably a roughened surface material or a rugous surface material. The roughness may be so coarse as to produce visible depressions in the surfaces. It may be comprised of rigid or flexible, woven or agglomerated, fibrous material. Examples of such materials are cardboard-like material, corrugated paper, sheets of porous or alveolar plastics material, or any other stuck non-woven fibers (cotton, polyester, glass, etc.), or woven fibers. Furthermore, the material can be impregnated or coated with at least one chemical reagent that is capable of reacting with contaminating gases (chemisorption) or with odiferous particles contained in the gaseous fluid to be purified and which it is desired to remove. Such a chemical reagent will be chosen so that when the polluting gases or smelly particles come into contact with the impregnated or coated surfaces, it transforms them into salts which remain fixed on the rugous surfaces.

The absorbent material may also be impregnated with a bacteriological agent, for example germicide solutions for killing micro-organisms contained in the fluid to be cleaned.

In a preferred embodiment of the invention, the chemical reagent is an oxidizing agent, in particular a permanganate and/or activated manganese dioxide. Activated $MnO_2$ is well known in the art; it exerts a greater and more rapid oxidizing action than ordinary $MnO_2$, and is usually formed by a careful partial reduction of $KMnO_4$. It is believed that the activated $MnO_2$ still contains some $KMnO_4$. It has been found that, most surprisingly, activated $MnO_2$ is formed quasi-automatically by impregnating paper with an aqueous solution of $KMnO_4$. Preferably, as material of disks of the rotor, one uses cellulose which is as pure as possible. It is thought that the cellulose acts as a reducing agent for transforming $KMnO_4$ into activated $MNO_2$.

The $KMnO_4/MnO_2$ system has another advantage. Since the salts of bivalent manganese (Mn(II)) which are formed when the oxidizing agent is depleted are white, this forms an indicator for the system. The decoloration thus indicates that the active material is reaching exhaustion, and the filter is changed.

Other oxidizing agents may be used for the impregnation or coating of the rotors: for example salts, oxides or hydroxides of Fe(III), the chromates or bichromates of salts of Sn(IV), Pb(IV), Ce(III), Ti(IV), vanadium, etc. It is also possible to use cyanoferrates (III) and in addition composites of $H_2O_2$, for example perborates, urea peroxide etc. These oxidizing agents, including $KMnO_4$ and activated $MnO_2$, may be used alone or mixed.

Use of an oxidizing agent is preferred since the most usual impurities of air are easily oxidizable. These impurities are, for example, $H_2S$, $SO_2$, solvent vapors (alcohols, ketones, esters, hydrocarbons, aldehydes), amines, greases, mercaptans, and so on.

Some of these impurities when oxidized give acidic products. For example, $H_2S$ and $SO_2$ are oxidized to $SO_3$. Normally, these oxidized products are retained by the material of the sheets, for example according to the following relationship:

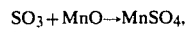

$$SO_3 + MnO \rightarrow MnSO_4,$$

the MnO being the product of the reaction.

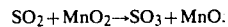

$$SO_2 + MnO_2 \rightarrow SO_3 + MnO.$$

To further increase the retaining power of the filter, one may add to the oxidizing agent with which the rotor disks are impregnated or coated, a base such as KOH, NaOh, $Na_2CO_3$ or $K_2CO_3$. It is also possible to apply the oxidizing agent to the median part of the rotor and to impregnate or coat the periphery with the base. As a variation, a cylindrical (or non-cylindrical) sheet is placed about the rotor and the air leaving the rotor comes to hit this sheet which is impregnated with a different reagent to that of the rotor; if it is for example impregnated with a base, this sheet will thus retain the acidic products of oxidation.

The material can be impregnated or coated with fragrance-imparting particles or perfumes which it is desired to introduce into the purified fluid.

The material may be treated with a fire-retarding agent in order to prevent a fire from developing due to a too violent reaction with the impurities or due to the gaseous fluid reaching a critical temperature.

An object of the invention is to provide an apparatus for cleaning gaseous fluids which is of simple structure, economical, easy to service, quiet in operation, has a low power consumption and which is capable of cleaning fluids by adsorption of impurities.

BRIEF DESCRIPTION OF THE DRAWINGS

Several embodiments of a gaseous fluid purifier in accordance with the invention are shown in the drawings, in which:

FIG. 1 is a side view of a first embodiment of a purifier, which is in the form of a filtering rotor;

FIG. 2 is a side cross-sectional view through the first embodiment of the purifier along the line II—II of FIG. 3;

FIG. 3 is a top view of the purifier shown in FIGS. 1 and 2;

DESCRIPTION OF THE PREFERRED EMBODIMENTS

Figure 4:
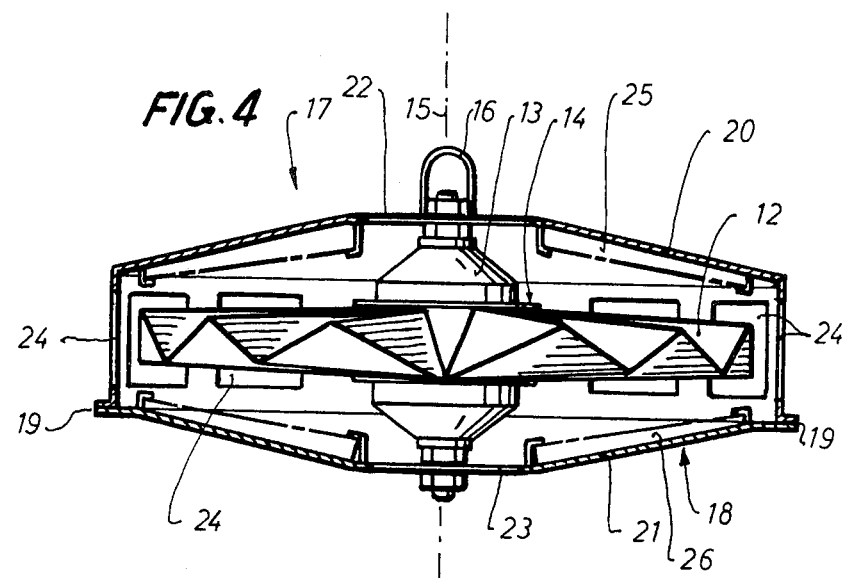
FIG. 4 is a side cross-sectional view through a second embodiment of a purifier, comprising a housing which supports a stationary purification stator located around a filtering rotor.

The first embodiment of filtering rotor 1 shown in FIGS. 1 to 3 comprises two disks 2 and 3 which are assembled along the same axis of rotation 4. Both disks 2 and 3 are pleated in shape, with each pleat extending radially, i.e. a "sun" pleat. The lower disk 3 is flat, as contrasted with the conical shape of disk 2. The disk 3 is pleated from its center out toward, but not at, its peripheral edge. The peripheral edge portion of the disk 3 is instead flat.

Each of the pleated disks 2 and 3 of the filtering rotor 1 is made from a rectangular strip of thin material having a rough surface, which is accordion folded in the direction of its width to define a succession of parallel pleats. The two ends of each strip are connected end to end to form the respective "sun" pleat of each disk. Each disk 2, 3 has a respective central opening 8, 7, which serves as its suction opening.

The material of the pleated disks has as rough or rugous a surface as is possible under the circumstances. For instance, the disks may be comprised of blotting paper, porous material or material formed of a base of compressed fibers or the disks may have surfaces covered with an agglomerate presenting a configuration of bulges, hollows, cells or points. The material of the disks is selected so that they can retain the particles that are suspended in the gas to be purified when the gas passes over the surfaces of the disks. The disks 2, 3 may also be made from material having rugous surfaces. Their pleated shape increase the turbulence of the fluid and the active surface of the rotor, which favors the depositing of the impurities on the walls of the rotor.

The pleated disk 2 is held in a circle around its center by the annular hoop or wire 9 on the upper portion which is intended to prevent the opening of the disk under forces generated when the rotor is rotated. The height h shown in FIG. 2 is maintained constant by the hoop 9.

The disk 3 is fastened onto a circular base plate 5 placed beneath the disk 3. The periphery of the frusto-conical disk 2 is fastened to the circular flat periphery of the base of the pleating 3 of the rotor by stapling, stitching, or gluing, etc. so as to create outlet openings 6, which serve as outlet orifices for the rotor 1. The base plate 5, the disk 3, and the frusto-conical disk 2 have central openings 7 and 8 which serve as suction orifices.

The circular base plate 5 is rigid and can be cut from the same material as that which constitues the disks 2 and 3. The base plate 5 has fastening means (not shown) comprised, for example of "Velcro" strips, self-adhesive strips, snaps, etc. and which fastening means are intended to permit the fastening of the base plate to another plate (also not shown) that is driven by a drive motor (not shown).

The filtering rotor 1 can be driven in various ways by a drive motor but this does not influence the filtering action of the rotor. It is preferred to fasten the rotor, by means of adhesive strips, for example, to the plate 5 which is of the same diameter as the filtering rotor and which is also concentric with the axis of the motor. In view of the light weight of the filtering rotor 1, this method of attachment makes it possible to place the motor in all positions, without the rotor becoming detached from the plate 5, which is secured to the shaft of the motor. The filtering rotors may thus be interchanged without the use of any tools.

The filtering action of the rotor commences when the rotor starts to rotate. The speed of rotation must be adapted to the dimensions and quality of the materials selected for the filtering rotor 1. However, the speed must also be sufficient to cause turbulent movement of the gaseous fluid around and within the rotor. The gaseous fluid is automatically caused to circulate in the direction indicated by the arrows 10 and 11 (FIG. 2). Rotation of the rotor causes a vacuum at the upper center of the rotor (opening 8 in FIGS. 1 to 3). The ambient air is aspirated along the outer wall of the rotor and is also aspirated within the rotor along the upper wall defined at the underside of layer 2 and along the upper side the circular base, the pleating 3 of FIG. 2.

The gaseous fluid aspirated within the rotor is discharged by the effect of centrifugal force through the peripheral openings 6 at the edge of the rotor. As the fluid approaches the periphery of the rotor, its speed increases, which has, as corollary, a decrease in the static pressure (Bernouilli theorem).

In an alternate embodiment (not shown), several disks are superposed concentrically to the axis of the motor (not shown in FIGS. 1-3) in order to increase the surfaces of contact of the material selected with the fluid in circulation between the opposed walls of adjacent disks. A pleated cone can be alternated with a smooth cone. Alternatively, one may use only pleated cones or smooth cones.

In all cases, the fluid does not pass through the conical or flat walls of the disks. It merely moves along said walls in a turbulent movement, i.e. at a velocity greater than the critical velocity below which the movement of the fluid would be a laminar.

In a further embodiment not shown in the drawings, two conical filtering rotors, identical to the one shown in FIGS. 1 to 3, can be coaxially fastened with their plates 5 facing toward each other on the cylindrical face of a rotor of a motor having an outer rotor, thereby forming only a single filtering rotor having two opposite inlets for aspirated fluid and having parallel peripheral discharges of the purified fluid. This construction doubles the quantity of fluid aspirated by a single filtering rotor without substantially increasing the size of the purifier. This construction may prove useful in certain applications for purifying the atmosphere of rooms of large height, since it improves the effect of convergence of the foul air towards the purifier. In this case, the purifier would be suspended from the ceiling of the room.

The frusto-conical shape of the filtering rotor 1 which has just been described has the effect of substantially increasing the rate of flow and the turbulence of the aspirated gaseous fluid as compared with a flat filtering rotor, while assuring better contact of the fluid with the walls of the rotor. By enclosing a flat pleated filtering rotor in a stationary biconical housing (stator), the same dynamic effects are obtained.

Figure 5:
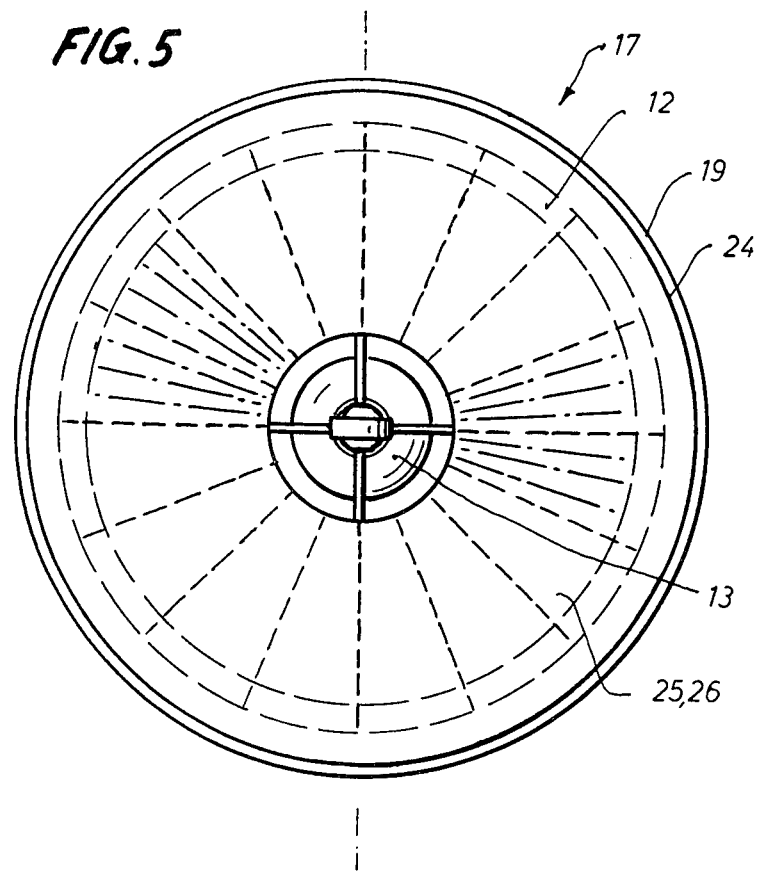
FIG. 5 is a top view of the embodiment of FIG. 4.

FIGS. 4 and 5 show a second embodiment of a purifier comprising a pleated filtering rotor 12. The rotor 12 is comprised of the same material as the disks 2, 3. The filtering rotor is fastened to the housing 14 of a motor 13. The motor housing serves as an external rotor 14. In the motor 13, the shaft of the motor at its axis 15 is held stationary while the motor housing and attached filtering rotor rotate. The axis 15 of the motor and the suspension ring 16 by which the purifier is suspended in a room, or the like, are fixed relative to rotation of the filtering rotor.

A stationary stator 17 is fastened to the non-rotative shaft of the motor. The stator is comprised of a lower part 18, which is removably attached at 19 and which serves as a lower cover. Removal of the lower part permits interchanging of the filtering rotor and of the upper gasket 20 and lower gasket 21 of the filtering stator. The stator is comprised of metal or of molded plastic. It has an upper inlet 22 at its top and a lower inlet 23 at its bottom through both of which the aspirated contaminated fluid enters into the stator as the motor rotates. The stator has peripheral outlets 24 through which the purified air can escape. The inner surfaces of the stator gaskets 20, 21 can be covered with pleated rings 25 and 26 comprised of the same material as the filtering rotor 12 or of a similar material. The rings 25, 26 are held against the inner walls of the stator gaskets by clips, adhesive tape, or any other suitable means of attachment (not shown). These pleated ring coverings have the effect of increasing the turbulence of the gaseous fluid within the purifier and of participating in the purification by retaining on their surfaces the impurities that are suspended in the fluid being purified. As in the case of the central rotating filter 12, the ring coverings 25, 26 are removable and replaceable upon reaching saturation.

The filtering rotor 12 presents, with the stationary pleated ring coverings 25 and 26, respectively, a circular corridor for passage of the gas to be purified. Because of the conical shapes of the gaskets 20, 21 and thus of the ring coverings 25, 26, that gas corridor becomes progressively shorter out to the periphery of the stator so that the upper part of the filtering rotor 12 and the covering 25, on the one hand, the lower part of the rotor 12 and the covering 26, on the other hand, each form a device similar to that described in connection with FIGS. 1 to 3. The only difference between these two embodiments is that the ring coverings 25 and 26 are stationary.

Figure 6:
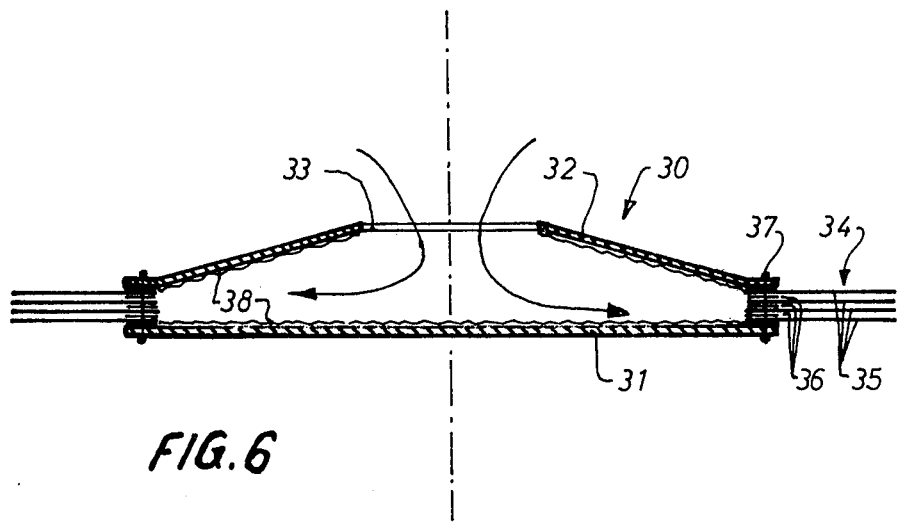
FIG. 6 is a side cross-sectional view through a third embodiment of a purifier, which is also in the form of a filtering rotor.

In the third embodiment shown in FIG. 6, the filtering rotor or filtering element 30 comprises a base disk 31 comprised, for instance, of a thin metal sheet and an upper disk 32 also comprised, for instance, of a thin metal sheet defining a very open frusto-conical configuration having a central aspiration opening 33. The peripheries of the disks 32 and 33 are spaced apart and retain between them a stack 34 of rough surfaced, annular leaves 35 that are spaced apart by spacers 36. The entire assembly is held together by pins 37.

The inner surfaces of both disks 31 and 32 are covered with a rough or rugous layer 38 that is formed of fibers agglomerated by a bonding agent. The disks 31 and 32 may alternatively be formed of pleated materials, the inner surfaces of which may or may not be treated. The disks may still further alternatively be made of simple metal leaves or foils. Then, the dust which agglomerates with the passage of time imparts the desired rough configuration to the surfaces of the disks.

The annular leaves 35, which are spaced a slight distance from each other, are intended to retain very fine dusts or impregnated or coated with a chemical reagent capable of reacting with contaminating or polluting gases which come into contact with the reagent. The leaves 35 can be impregnated or coated with activated charcoal. Alternatively, the leaves 35 can be impregnated with a germicide, a perfume or with water. Coarse particles of impurities will be retained on the rough surfaces 38 within the filtering rotor 30, and only the very small particles or the gases will arrive at the stack 34 and be adsorbed on the leaves 35.

The outer surface of the base disk 31 carries fastening means (not shown) which enable it possibly to be fastened to a drive plate of a motor (not shown).

To increase the capacity of the filtering rotor of FIG. 6, a second central suction opening (not shown) may be provided in the base disk 31 or a plurality of frusto-conical disks, as mentioned above in connection with the embodiment of FIGS. 1 to 3, may be provided.

The third embodiment shown in FIG. 6 combines the advantages of the conical filtering rotor with the advantages of a simple annular multi-layer filter. A large "filtering" surface is provided. Thus, there is excellent contact with the fluid to be purified. There is ease of impregnation for the adsorption of the gases chemically (chemisorption).

As a variant of this embodiment, neutralization of odors by rings cut from sheets of paper impregnated with activated charcoal and applied to the disks 35 is available. As a further variant, disturbing odors may be neutralized by a perfume with which the rings have been previously impregnated.

Summarizing, the central (conical) portion (disks 30, 31 in the third embodiment) of the rotary filter takes up the fluid to be purified with a large rate of flow and relatively high pressure (20 to 30 mm water column). The central portion of the filter removes dust, aerosols, dirt, pollen, etc., and the annular portion (leaves 35 in the third embodiment) completes the purification by chemically neutralizing harmful gases which may still be in suspension in the fluid.

Chemical impregnation of the central portion disks 30, 31 is possible but unnecessary, inasmuch as chemical impregnation of the annular portion for neutralizing gases which pass through it is adequate.

In all of the embodiments, the material used for making the flat, pleated, frusto-conical, annular disks, etc., will preferably be a rough material. If it is preferable for the disks to be capable of being impregnated, for instance with chemicals, perfumes, insecticides, bacteriological products, or simply water, then the rough surface should also be absorbent. The absorbent character of these materials is, however, necessary only if it is desired to impregnate them.

Impregnation of the materials constituting the filtering rotor can be effected with any natural or chemical product, after the rotor materials have been simply moistened with water if desirable by passage through any chemical reagents. Impregnation may be with metallic oxidizers (such as activated manganese-dioxide $MnO_2$), or the material might be paper with activated charcoal incorporated in the fibrous material of the paper, non-flammable papers or fabrics, perfumed papers or fabrics, etc. The material may in this way be adapted for the particular chemical contaminant to be neutralized. However, whatever the chemical impregnation selected, the filtering rotor will also retain the dusts and aerosols in any form in which they are and whatever their size, from the smallest (tobacco smoke, for instance,) up to an upper limit which is a function of the centrifugal force which acts on the particles suspended in the fluid to be purified (probably 100 microns at the customary speeds of rotation adopted of between 200 and 1500 rpm).

In principle, there are no dimensional limits on the construction of the types of filtering rotor described above. The larger the diameter, the greater the filtering surface and the greater the rate of flow of aspirated fluid. The larger the pitch at which the selected material has been pleated, the greater the rate of flow of aspirated gaseous fluid will be, all other parameters being equal.

Figure 7:
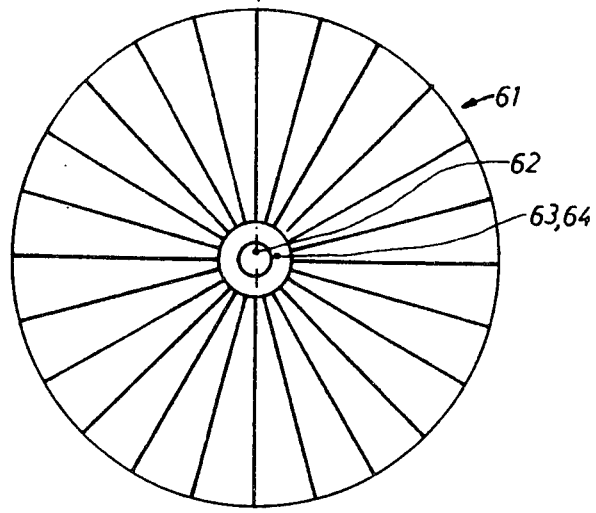
FIG. 7 is a schematic top plan view of a fourth embodiment of gaseous-fluid cleaning apparatus comprising a rotor which acts as a centrifugal filter.
Figure 8:
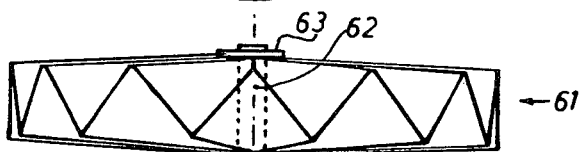
FIG. 8 is a side view of the rotor of the apparatus of FIG. 7.

The gaseous-fluid cleaning apparatus shown in FIGS. 7 and 8 comprises a rotor 61 arranged to operate, without or with a casing, in a gaseous fluid to be cleaned. The rotor 61 is in the form of a pleated disc fixed on a shaft 62 by means of upper and lower securing washers 63 and 64. Shaft 62 is driven by a motor, not shown, The disc 61 is made simply from a rectangular band of thin material with a rough or rugous or alveolar surface which is folded across its width and the two ends joined together edge-to-edge, to form a radially pleated ring with a central opening through which the shaft 62 passes. The securing washers 63, 64 may be simple friction washers fitted on the shaft 62, or may be secured by screws (not shown). The disc 61 may be assembled to the shaft 62, and possibly to the washers 63 and 64, by an adhesive.

The apparatus of FIGS. 7 and 8 is particularly suitable for cleaning air since such an apparatus with a multi-folded rotor operating in an enclosure, such as a room, produces a circulation of air in the enclosure with the apparatus as the point of convergence. This natural suction of the ambient air through the apparatus takes place silently, since even at slow speeds of rotation, there is a great flow of air through the apparatus. The pleated disc 61 perfectly functions as both rotor and filter. The flow of air produced by a disc 61 of 400 mm external diameter rotating at 200 r.p.m. is of the order of 300 m$^3$/h per face of the disc, or 600 m$^3$/h for the two faces of the pleated rotor. At this very low speed of rotation, the apparatus makes no noise. The 400 mm diameter disc with which the above-quoted flow measurements were carried out was made of a cellulose paper about 1 mm thick, and folded to provide a disc thickness of 3 to 4 cm.

When the apparatus of FIGS. 7 and 8 is used to purify air containing polluting gases ($H_2S$ or $SO_2$ for example), the pleated disc 61 may be impregnated or coated with an appropriate chemical reagent, according to the polluting gas to be removed.

The disc 61 may, as previously mentioned, be impregnated with perfumes or germicides. Also, the apparatus of FIG. 7 can be arranged to act as an air humidifier, by imbibing the disc 61 with water. This can be achieved in a simple manner, for example by directing a jet of water against the disc or by making the rotor shaft of a porous material and placing it in contact with water in, for example, a tank.

Figure 9:
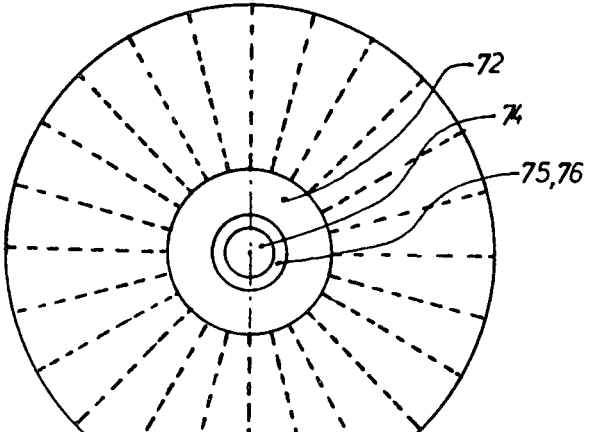
FIG. 9 is a top plan view of a variation of the rotor of the embodiment of FIGS. 7 and 8.
Figure 10:
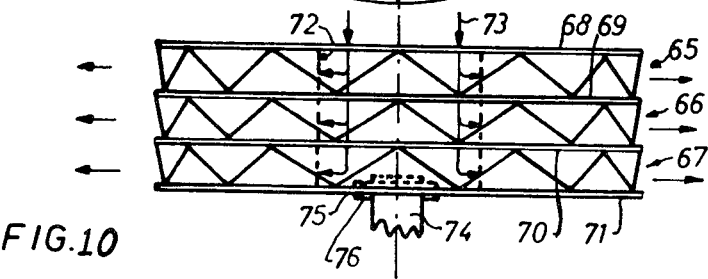
FIG. 10 is a side view of the rotor of FIG. 9.

FIGS. 9 and 10 show a fifth embodiment comprising three disks 65, 66 and 67 similar to the disk 61 of FIG. 7, supported and spaced apart by flat circular sheets 68, 69, 70 and 71 (FIG. 10) formed of a similar material to the pleated disks 65 to 67. The folding of disks 65 to 67 is arranged to leave a central hole 72 and the sheets 68, 69 and 70 have like circular holes positioned so that when the rotor is rotated, air is drawn into the center of the turbine and, as indicated by arrows 73 in FIG. 10, passes through hole 72 and flows out between channels formed by the pleats of the three disks 65, 66 and 67 and the sheets 68, 69, 70 and 71. The bottom sheet 71 has a smaller central opening than the other sheets, to receive the driving shaft 74 of a motor (not shown). Sheet 71 is secured to the shaft 74 by two washers 75, 76. The rotor formed by the pleated disks 65 to 67 and sheets 68 and 71 may be assembled by an adhesive, by riveting, etc.

The sheet material used to make the turbine of FIGS. 9 and 10 is the same as that described for the embodiment of FIGS. 7 and 8, and may be subjected to the same treatments.

The rotor of FIGS. 9 and 10 may advantageously be enclosed in a casing (not shown), for example a cylindrical or volute-shaped casing, with a central intake and radial or tangential outlet.

Figure 11:
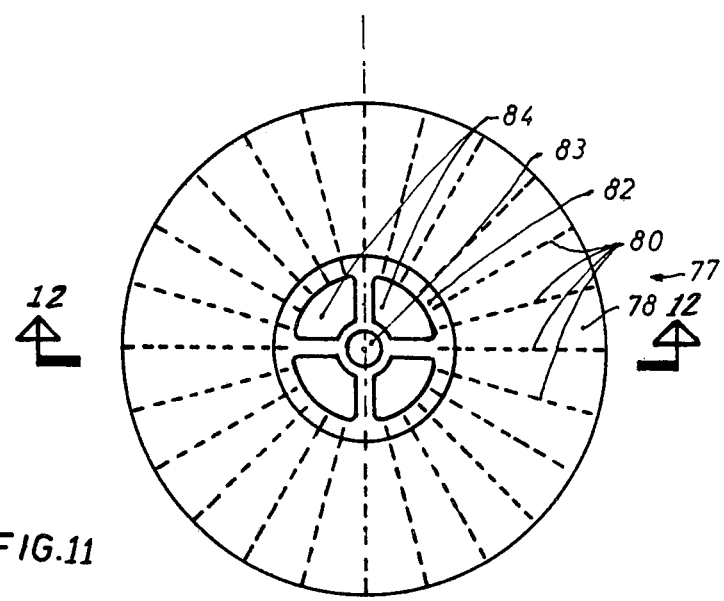
FIG. 11 is a top plan view of a fifth embodiment of gaseous-fluid cleaning apparatus also comprising a rotor which acts as filter.
Figure 12:
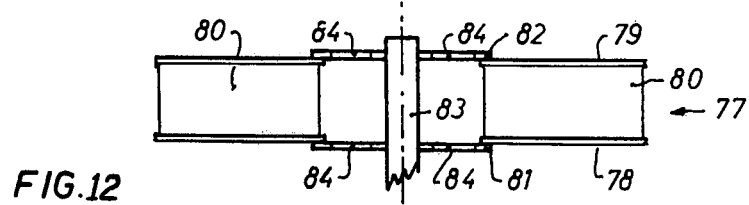
FIG. 12 is a cross-section along line XI—XI of FIG. 11.

The embodiment shown in FIGS. 11 and 12 comprises a rotor 77 having lower and upper annular sheets 78 and 79 spaced apart by radially-directed bands 80 regularly spaced from one another around the circumference. The sheets 78, 79 and bands 80 may, as for the components of FIGS. 9 and 10, be assembled by an adhesive when they are formed of paper or of an agglomerate of woven or non-woven fibers. If the rotor is made of semi-rigid alveolar plastics material, it may for example be assembled by heat welding. However, it will be apparent to persons skilled in the art that the rotors of all of the described embodiments can be assembled by an known means, such as stapling, riveting, point assembly, sewing, etc.

The assembled rotor 77 is held between two circular flanges 81 and 82 secured on a shaft 83 of a motor not shown, the two flanges having air-intake openings 84. When the rotor 77 is rotated, the gaseous fluid drawn in through the openings 84 flows out through radial channels defined by the lower and upper sheets 78, 79 and bands 80. As with the preceding embodiment, the rotor 77 may be enclosed in a casing (not shown) with central intake openings through which foul gaseous fluids to be cleaned are drawn in or delivered through a pipe, and one or several lateral outlets through which the purified gaseous fluid can be delivered to a given location.

Figure 13:
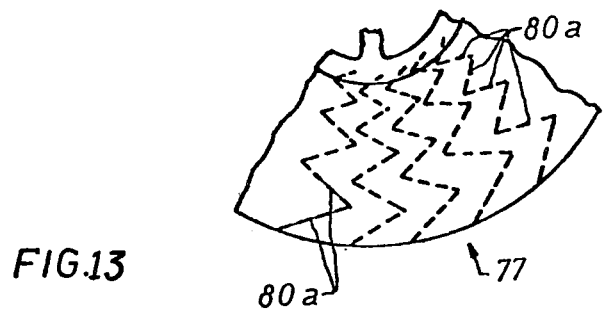
FIG. 13 is a partial top plan view of a variation of the rotor of the embodiment of FIGS. 11 and 12.

In the variation of FIG. 13, the planar bands 80 of rotor 77 of the embodiment of FIGS. 11 and 12 are replaced by generally radially disposed bands 80a folded in zig-zag configuration to make the fluid undergo changes of direction which will bring the particles in suspension, or the gas particles to be removed, into contact with the walls of the folded bands 80a.

The bands 80, 80a of FIGS. 11–13 may, in variations not shown, be disposed in the form of deflector blades fixed in a single annular disc 78 or 79 according to known techniques of constructing the rotors or turbines of centrifugal ventilators.

All the described embodiments operate in the same manner. The gas flows through the rotors with a turbulent flow. With such a turbulent flow, the particles in suspension or particles of unwanted gases to be fixed, in the case where the rotor is treated with a chemical reagent, have the greatest possibility of being retained on the rough or rugous surfaces of the turbine and its disks. It is also clear that several rotors of any of the types shown herein can be assembled to form a unit with several stages, as illustrated for the embodiment of FIGS. 9 and 10, and the rotors can be enclosed in a casing with air intake and outlet orifices, or can be unencased.

Of course, the described filters are inter-changeable and may even be cleaned for re-use. Their cost price is moderate. The material of which they consist may be treated chemically, for example coated with activated manganese dioxide, alone or containing potassium permanganate or a basic substance able to retain acidic products of oxidation of the impurities. They may also be coated with perfumes or bacteriological agents. It will be understood that the materials may be coated with not one but several chemical reagents, each chosen as a function of the gaseous component it must retain. A fixed cylindrical or frusto-conical body may be placed about the rotor of the apparatus to upwardly and/or downwardly deviate the current of gasesous fluid produced by the turbine. The body placed about the rotor may have a rough or rugous surface to retain the remaining impurities of the deviated current which have not be previously fixed on the rotor. The surface of the body can be flat, undulated, pleated or folded. Such a body may have at least one chemical reagent able to react with and retain the products of reaction of the impurities which pass out of the filter, or may be impregnated with a germicide. It may also be imbided with water to humidify the purified air which leaves the rotor. Alternatively, such a body may be a cooled metal surface which dries purified air leaving the periphery of the filter unit by condensing water on the cold surface.

Although the present invention has been described in connection with preferred embodiments thereof, many variations and modifications will now become apparent to the skilled in the art. It is preferred, therefore, that the present invention be limited not by the specific disclosure herein, but only by the appended claims.

What is claimed is:

1. A gaseous fluid purifier, comprising a turbine which includes a motor and a rotor drivingly connected with the motor to be rotated thereby, the rotor comprising at least one rotary disc which is pleated in shape and which has a pleated surface when the rotor is rotated, the said pleated surface being rough and thereby able to retain particles from the flux of gaseous fluid which travels along the pleated surface, and the rotary disc being an adsorbent material that blocks the flux of the fluid and the particles from passing through the rotor, whereby, during the rotation thereof, the rotor performs a ventilating function and the said pleated surface thereof performs a gaseous fluid filtering function; and means for positioning said rotor is communication with a gaseous fluid so that, when rotated, it will purify the gaseous fluid.

2. The gasoues fluid purifier of claim 1, wherein the disc is pleated in a sun pleat form, comprising pleats arrayed around the disc and each pleat radiating from the center of the disc.

3. The gaseous fluid purifier of claim 1, wherein the rotary disc is pleated so that it has opposite pleated surfaces pleated in the same manner.

4. The gaseous fluid purifier of claim 3, wherein the pleats on the opposite surfaces of the rotary disc are complementary.

5. The gaseous fluid purifier of claim 1, comprising a second rotary disc having a common axis of rotation with the first rotary disc and spaced apart therefrom along said common axis, both disc having respective peripheries and centers and both being pleated in a sun pleat form comprising pleats arrayed around the respective discs so that each pleat radiates from the center of the respective disc, the pleated surfaces of the discs being opposed; at least one of the discs being of conical shape broadening toward the other disc, the disc being oriented such that the distance between the two discs at the peripheries thereof is smaller than the distance between the two discs at the centers thereof; a central suction opening defined in at least one of the discs; and the discs defining between them at the disc peripheries a peripheral outlet opening.

6. The gaseous fluid purifier of claim 5, wherein both of the discs are pleated so that each has opposite pleated surfaces and the pleats for each disc on the opposite surfaces of the disc are complementary.

7. The gaseous fluid purifier of claim 5, comprising a plurality of said discs of conical shape and wherein adjacent each disc of conical shape is a respective other one of the discs, each conically shaped disc defining, together with the respective adjacent disc, a gaseous fluid outlet which narrows toward the disc peripheries.

8. The gaseous fluid purifier of claim 7, wherein at least one of the discs is drivably connected to the motor for rotation and the adjacent disc is relatively stationary.

9. The gaseous fluid purifier of claim 7, wherein the conical disc and the adjacent disc are integrated at their peripheries and define at least one outlet orifice thereat.

10. The gaseous fluid purifier of claim 9, wherein all of the discs are pleated so that each has opposite pleated surfaces, and wherein the pleats for each disc on the opposite surface of the disc are complementary.

11. The gaseous fluid purifier of claim 1, wherein there are a plurality of the pleated discs arranged as a pile and a shaft which passes through the center of the pile, the disc having adjacent to their centers at least one fluid-intake opeining; and spaces in the form of annular planar discs placed between mutually adjacent pleated discs, each of said planar discs being of the same material as the pleated discs.

12. The apparatus according to claim 1, in which the rotor material is a fibrous, non-woven material.

13. The apparatus according to claim 1, in which the material of the rotor is impregnated with a chemical reagent able to bind particles in the fluid to be cleaned.

14. The apparatus according to claim 13, in which the chemical reagent is a basic substance able to fix acidic products of oxidation of impurities contained in the fluid to be cleaned.

15. The apparatus according to claim 13, in which the chemical reagent is activated manganese dioxide.

16. The apparatus according to claim 15, in which the chemical reagent further contains potassium permanganate.

17. The apparatus according to claim 1, wherein said rotor is impregnated with a germicidal agent.

18. The apparatus according to claim 1, wherein said rotor is impregnated with water.

19. The apparatus according to claim 1, wherein said rotor is comprised of cellulose paper.

20. The apparatus according to claim 1, wherein said rotor is impregnated or coated with activated charcoal.

21. A gaseous fluid purifier, comprising at least two rotatable discs having a common axis of rotation and being spaced apart from each other along their common axis, the said discs having respective peripheries and centers and at least one of the discs being of conical shape broadening toward the other disc, said discs being oriented such that the distance between them at their peripheries is less than the distance between them at their centers; a central suction opening defined in at least one of the discs; said discs defining between them at their peripheries a peripheral outlet opening; both of the discs being comprised of a material having rough surfaces, whereby the discs have rough surfaces for adsorbing impurities in gaseous fluid passing over said surfaces when the discs are rotated about said common axis as a rotor; and a stack of annular sheets provided at the peripheries of the discs, the annular sheets of which are oriented generally parallel to the disc cross sections that are transverse to the said common axis and are comprised of a material having rough surfaces, whereby the annular sheets have rough surfaces; said annular sheets being impregnated with a chemical reagent adapted to bind particles of undesired gaseous components which are contained in the gaseous fluid to be purified.

22. The gaseous fluid purifier of claim 21, wherein the annular sheets are impregnated with a germicidal agent.

23. The gaseous fluid purifier of claim 21, wherein the annular sheets have activated charcoal on the surfaces thereof.

24. The gaseous fluid purifier of claim 21, wherein the discs are formed of a fibrous, non-woven material.

25. A gaseous fluid purifier, comprising an annular sheet; a plurality of radially directed bands placed on said sheet, and regularly spaced apart from one another around the circumference of the annular sheet; both said sheet and said bands having rough surfaces which are able to retain particles from a flux of the gaseous fluid which passes over the sheet and the bands; the annular sheet and the bands being of a material that blocks the flux and the particles from passing through it; and means at the center of the annular sheet for mounting said sheet as a rotor on the output shaft of a motor.

26. The gaseous fluid purifier of claim 25, further comprising a second annular sheet, the radially directed bands being placed between the annular sheets.

27. The gaseous fluid purifier of claim 25, wherein the annular sheet and the bands are formed of a fibrous, non-woven material.

* * * * *

UNITED STATES PATENT OFFICE
CERTIFICATE OF CORRECTION

PATENT NO. : 4,292,055
DATED : September 29, 1981
INVENTOR(S) : Pierre M. T. de Castella, et al.

It is certified that error appears in the above-identified patent and that said Letters Patent are hereby corrected as shown below:

Column 11, Line 48, "is" should read --in--.

Column 11, Line 51, "gasoues" should read --gaseous--.

Column 11, Line 64, "disc" should read --discs--.

Signed and Sealed this

Fifteenth Day of December 1981

[SEAL]

Attest:

GERALD J. MOSSINGHOFF

Attesting Officer

Commissioner of Patents and Trademarks